United States Patent [19]

Perzley

[11] Patent Number: 4,603,284
[45] Date of Patent: Jul. 29, 1986

[54] CONTROL SYSTEM FOR MANIPULATOR APPARATUS WITH RESOLVED COMPLIANT MOTION CONTROL

[75] Inventor: William Perzley, Weston, Conn.
[73] Assignee: Unimation, Inc., Danbury, Conn.
[21] Appl. No.: 617,363
[22] Filed: Jun. 5, 1984
[51] Int. Cl.$^4$ ............................................. G05B 19/42
[52] U.S. Cl. .................................. 318/568; 318/632; 364/513; 901/45
[58] Field of Search .................. 318/632, 568, 568 M; 364/513; 901/9, 45

[56] References Cited

U.S. PATENT DOCUMENTS 4,219,766 8/1980 Lin ....................................... 318/594
4,362,978 12/1982 Pollard et al. ................... 318/632 X Primary Examiner—B. Dobeck
Attorney, Agent, or Firm—Mason, Kolehmainen, Rathburn & Wyss

[57] ABSTRACT

A control system for manipulator apparatus having a manipulator arm movable in a plurality of axes utilizes resolved compliant motion control to improve servo response characteristics. The position and velocity of the manipulator arm are controlled using load modeling to account for compliance in the arm and to synthesize feedback signals representing movement of a remote point of the arm to provide a loop bandwidth greater than is possible using feedback signals from inner less remote points of the manipulator that are closer to the drive points. The feedback signals are derived using predetermined combinations of force related feedback signals from the axis drive arrangements and position and velocity feedback signals of the manipulator apparatus at points closer to the main drive and support structure of the manipulator and before certain compliant portions of the manipulator arm. To further enhance response and control of the manipulator arm, load modeling is also used to provide controlled deceleration before the manipulator arm is brought to a stop during work operation.

26 Claims, 17 Drawing Figures

CONTROL SYSTEM FOR MANIPULATOR APPARATUS WITH RESOLVED COMPLIANT MOTION CONTROL

BACKGROUND OF THE INVENTION

1. Field of the Invention

The present invention relates to control systems and methods for manipulators and more particularly to a control system and method for improving servo loop response by sythesizing feedback signals and utilizing load modeling to provide resolved compliant motion control.

2. Description of the Prior Art

The speed of servo loop control systems for manipulator apparatus having a manipulator arm movable in a plurality of axes or joints depends upon the bandwidth of the control loops for the joints. Since manipulators, especially those with high load ratings, have a very low first antiresonant structrual frequency, the response of these control systems and thus the speed for stable operation is limited to relatively low values. The use of a torque loop and pressure (hydraulic) or current (electrical) feedback and inertia scaling have improved the stable response of manipulator apparatus for example as discussed in U.S. Pat. No. 4,362,978.

Since it would be desirable to achieve faster response and operating speeds, assuming that the mechanical design is optimized, the only other possibility is to improve the control system.

One approach would be to utilize feedback signals from points or joints of the manipulator arm that provide increased bandwidth. However, due to the complex nature of joint or axis interconnection and structural members, these feedback signals are both theoretically and practically difficult to obtain either by computation or measurement.

SUMMARY OF THE INVENTION

Accordingly it is a principal object of the present invention to provide a control system for manipulator apparatus with improved loop bandwidth and servo response by using load modeling techniques to account for structural compliance and to synthesize feedback signals representing movement at more remote points of the arm located after compliant structure; the synthesized signals being synthesized from feedback signals representing movement before or in front of the compliant structure and the use of the synthesized feedback signals raising the servo loop bandwidth beyond the first antiresonant frequency of the manipulator structure.

Briefly, these and other objects of the present invention are achieved by providing a control system for manipulator apparatus having a manipulator arm movable in a plurality of axes that utilizes resolved compliant motion control to improve servo response characteristics. The position and velocity of the manipulator arm are controlled using load modeling to account for compliance in the arm and to synthesize feedback signals respresenting movement of a remote point of the arm to provide a loop bandwidth greater than is possible using feedback signals from inner less remote points of the manipulator that are closer to the drive points. The feedback signals are derived using predetermined combinations of force related feedback signals from the axis drive arrangements and position and velocity feedback signals of the manipulator apparatus at points closer to the main drive and support structure of the manipulator and before certain compliant portions of the manipulator arm. To further enhance response and control of the manipulator arm, load modeling is also used to provide controlled deceleration before the manipulator arm is brought to a stop during work operation.

The invention both as to its organization and method of operation together with further objects and advantages thereof will best be understood by reference to the following specification taken in conjunction with the accompanying drawings.

DESCRIPTION OF THE PREFERRED EMBODIMENT

The present invention is useful for controlling manipulator apparatus having compliant structure intermediate the driven point of the structure and the more remote points of the manipulator arm structure by synthesizing feedback signals representing outer arm positions from sensed feedback signals at structural points closer to the drive point and before the compliant structure. The practice and structure of the present invention will be described using an illustrative example for a typical manipulator structure and for one controlled axis of the manipulator. However, as will be explained in more detail hereinafter, the present invention is applicable to various forms of manipulator structure and for use to control movement in any one or more axes of the manipulator.

Considering the manipulator structure described in U.S. Pat. Nos. 3,661,051 and 4,275,986 the manipulator joints or axes corresponding to the interconnected structural portions that are driven to control movement of the manipulator arm are active compliant systems with flexible structure including many degrees of spring members. In practical systems and for practical work considerations, only one or two spring members affect the performance of the manipulator joint since these spring members are much less stiff and thus dominate over the other spring members. The more dominant spring members are usually located at the connection between structural members.

Figure 1A:
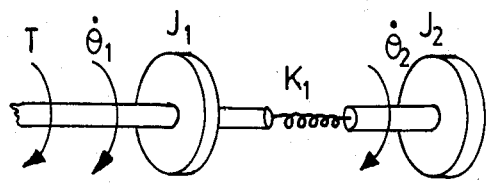
FIGS. 1a and 1b are mechanical model and electrical analogue representations respectively of a first type of manipulator apparatus.
Figure 1B:
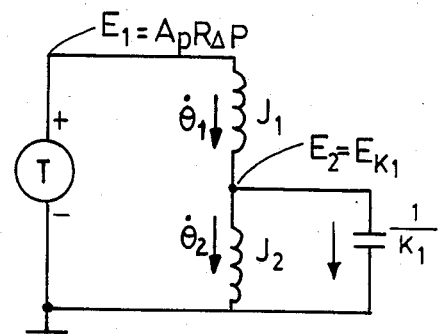

Referring now to FIG. 1, each joint and associated structure of most small electrical manipulators can be represented as a joint with one degree of compliant motion and can be modeled as the two mass-one spring system of FIG. 1a and having an electrical analogue circuit as shown in FIG. 1b, where the applied torque T corresponds to voltage, the inertia of each mass J corresponds to inductance, velocity $\dot{\theta}$ corresponds to current and the spring constant K corresponds to the reciprocal of capacitance. In this model $\dot{\theta}_1$ represents the joint velocity sensed by a feedback tachometer, $\dot{\theta}_2$ represents the load velocity, $J_1$ represents the motor or trunk inertia, $J_2$ represents the inertia of the load and arm joint structure and $K_1$ represents the stiffness of a harmonic drive.

The following relationships mathematically define this model:

$$T - K_1(\theta_1 - \theta_2) = J_1 \ddot{\theta}_1 \quad (1)$$

$$K_1(\theta_1 - \theta_2) = J_2 \ddot{\theta}_2 \quad (2)$$

Transfer functions between velocity and torque can be obtained as:

$$\frac{\dot{\theta}_1(s)}{T(s)} = \frac{1 + s^2/w_{a1}^2}{(J_1 + J_2)s(1 + s^2/w_{r1}^2)} \quad (3)$$

$$\frac{\dot{\theta}_2(s)}{T(s)} = \frac{1}{(J_1 + J_2)s(1 + s^2/w_{r1}^2)} \quad (4)$$

$$w_{r1}^2 = K_1 / \frac{(J_1 J_2)}{(J_1 + J_2)} \quad (5)$$

$$w_{a1}^2 = \frac{K_1}{J_2} \quad (6)$$

where $w_{r1}$ and $w_{a1}$ are the resonant and antiresonant frequencies respectively as obtained from $J_1$, $J_2$ and $K_1$, with $w_{a1}$ being lower than $w_{r1}$.

The parameters $J_1$, $J_2$, and $K_1$ if not readily calculated from geometry can be obtained by a frequency analyzing method wherein the joint actuator is driven with a sinusoid input torque at different frequencies while the joint velocity $\dot{\theta}_1$ from the tachometer is recorded. The frequency with a minimum ratio of $/\dot{\theta}_1/T/$ is $w_{a1}$ and the frequency with the maximum ratio of $/\dot{\theta}_1/T/$ is $w_{r1}$. Further, from relationship (3), at very low frequencies the joint and associated structure behave as a rigid system with one total inertia $J_t = J_1 + J_2$. Accordingly, $J_t$ is obtained from tachometer measurements and the values of applied torque or pressure are obtained from hydraulic actuators. From the values of $J_t$, $w_{a1}$ and $w_{r1}$, joint parameters can be calculated from the following relationships obtained from relationships (5) and (6):

$$J_1 = \left( \frac{w_{a1}^2}{w_{r1}^2} \right) J_t \quad (7)$$

$$J_2 = J_t - J_1 \quad (8)$$

$$K_1 = J_2 w_{a1}^2 \quad (9)$$

The parameters $J_1$ and $K_1$ are obtained and the load inertia $J_2$ varies for different loads and manipulator position.

Considering larger manipulators, for example the UNIMATE ® 2000 or 4000 series apparatus as shown in FIG. 1 of U.S. Pat. No. 3,661,051, the rotary joint or axis defined by motion of the boom or arm assembly 50 about a vertical axis of the trunk 60 corresponds to a system with two degrees of compliance, i.e. two spring members. The first of the spring members represents the connection of the boom or arm 50 at the "shoulder" joint to the trunk 60. The second spring member represents the compliance of the boom assembly 50.

In the case of revolute joint manipulator apparatus such as described in U.S. Pat. No. 4,275,986 and having controlled axes or joints as depicted in FIG. 27 of that patent, the second spring member is located at the elbow.

Figure 2A:
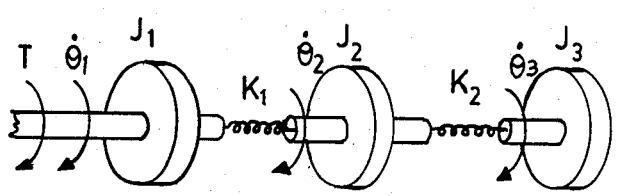
FIGS. 2a and 2b are mechanical model and electrical analogue representation respectively of a second type of manipulator apparatus.
Figure 2B:
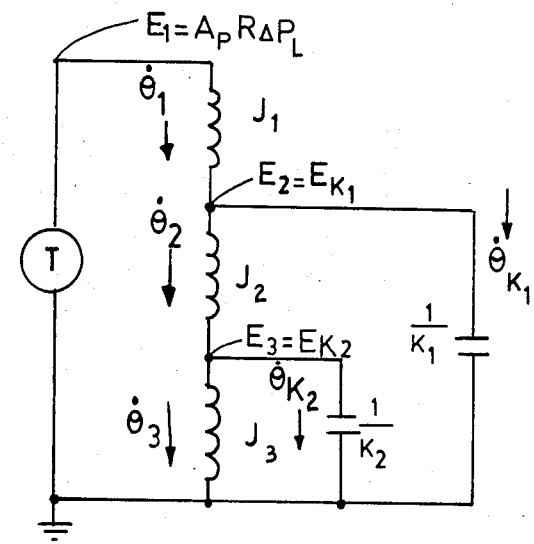

Referring now to FIG. 2, the mechanical model of the three mass-two spring system of FIG. 2a represents the rotary axis or joint of a heavy duty manipulator. The analogous electrical circuit is shown in FIG. 2b. In this model, the damping coefficient is neglected.

The model of FIG. 2 can be represented by the following relationshps:

$$T - K_1(\theta_1 - \theta_2) = J_1 \ddot{\theta}_1 \quad (10)$$

$$K_1(\theta_1 - \theta_2) - K_2(\theta_2 - \theta_3) = J_2 \ddot{\theta}_2 \quad (11)$$

$$K_2(\theta_2 - \theta_3) = J_3 \ddot{\theta}_3 \quad (12)$$

The transfer functions between velocities and torque can be obtained as:

$$\frac{\dot{\theta}_1(s)}{T(s)} = \frac{(1 + s^2/w_{a1}^2)(1 + s^2/w_{a1}^2)}{J_t s(1 + s^2/w_{r1}^2)(1 + s^2/w_{r2}^2)} \quad (13)$$

$$\frac{\dot{\theta}_2(s)}{T(s)} = \frac{(1 + s^2/w_{a3}^2)}{J_t s(1 + s^2/w_{r1}^2)(1 + s^2/w_{r2}^2)} \quad (14)$$

$$\frac{\dot{\theta}_3(s)}{T(s)} = \frac{1}{J_t s(1 + s^2/w_{r1}^2)(1 + s^2/w_{r2}^2)} \quad (15)$$

where $J_t = J_1 + J_2 + J_3$ \quad (16)

$$w_{r1}^2 = \tfrac{1}{2}(e - \sqrt{e^2 - f}) \quad (17)$$

$$w_{r2}^2 = \tfrac{1}{2}(e + \sqrt{e^2 - f}) \quad (18)$$

$$e = \frac{(J_1 + J_2)J_3 K_1 + (J_2 + J_3)J_1 K_2}{J_1 J_2 J_3} \quad (19)$$

-continued $$f = \frac{4K_1K_2J_t}{J_1J_2J_3} \quad (20)$$

$$w_{a1}^2 = \tfrac{1}{2}(g - \sqrt{g^2 - h}) \quad (21)$$

$$w_{a2}^2 = \tfrac{1}{2}(g + \sqrt{g^2 - h}) \quad (22)$$

$$g = \frac{J_2K + J_3(K_1 + K_2)}{J_2J_3} \quad (23)$$

$$h = \frac{4K_1K_2}{J_2J_3} \quad (24)$$

$$w_{a3}^2 = \frac{K_2}{J_3} \quad (25)$$

where $w_{a1} < w_{r1} < w_{a2} < w_{r2}$, $w_{a1} < w_{a3} < w_{a2}$.

In the example of a UNIMATE ® 2000 series manipulator, the parameters are defined as follows:

$J_1$: Trunk Inertia
$\dot{\theta}_1$: Trunk Velocity
$J_2$: Boom Inertia
$\dot{\theta}_2$: Boom Velocity
$J_3$: Hand or Load (outer arm) Inertia
$\dot{\theta}_3$: Hand or Load (outer arm) velocity Since the parameters are normally not known and are rather difficult to calculate due to geometry, the frequency analyzing method as discussed previously is used by driving the actuator with a sinusoid input torque at different frequencies and recording $\dot{\theta}_1$ with a tachometer and recording $\dot{\theta}_2$ and $\dot{\theta}_3$ by integration from accelerometers. Further, $w_{a1}$, $w_{a2}$, $w_{a3}$, $w_{r1}$ and $w_{r2}$ are determined from amplitude and phase versus frequency plots. Additionally, the total inertia can be obtained by the low frequency method discussed previously. With the parameters $J_t$, $w_{a1}$, $w_{a3}$, $w_{r1}$ and $w_{r2}$, the remaining joint parameters can be approximately obtained in accordance with the following relationships:

$$\text{let } a = w_{a3}^2 = K_2/J_3 \quad (26)$$

$$\text{let } b = w_{a1}^2 w_{2a}^2 = \frac{K_1K_2}{J_2J_3} \quad (27)$$

$$\text{let } c = \frac{w_{a1}^2 w_{a2}^2}{w_{a1}^2 + w_{a2}^2} = \frac{K_1K_2}{J_2K_2 + J_3(K_1 + K_2)} \quad (28)$$

$$\text{let } d = w_{r1}^2 w_{r2}^2 = \frac{J_tK_1K_2}{J_1K_2J_3} \quad (29)$$

With substitution of these variables the parameters can be obtained as follows:

$$J_1 = \frac{b}{d} J_t \quad (30)$$

$$J_2 = \frac{a^2c}{bd}\left(\frac{d-b}{a-c}\right) J_t \quad (31)$$

$$J_3 = J_t - J_1 - J_2 \quad (32)$$

$$K = \frac{b}{a} J_2 \quad (33)$$

$$K_2 = a J_3 \quad (34)$$

From these relationships it can be seen that for all manipulator structures, $J_1$, $J_2$ and $K_1$ are constants and $J_3$ is a load dependent variable. Further $K_2$ is a constant for a revolute joint arm and is a variable for manipulators with arm or boom assemblies including an extensible section as shown in U.S. Pat. No. 3,661,051.

In accordance with the models and analogue circuits and associated parameters, the antiresonant frequency $w_{a1}$ is identified as the limiting factor for a joint velocity control servo loop where $\dot{\theta}_1$ is sensed as a servo loop feedback signal either from a tachometer or as the derivative of a position encoder from the manipulator trunk.

Figure 3:
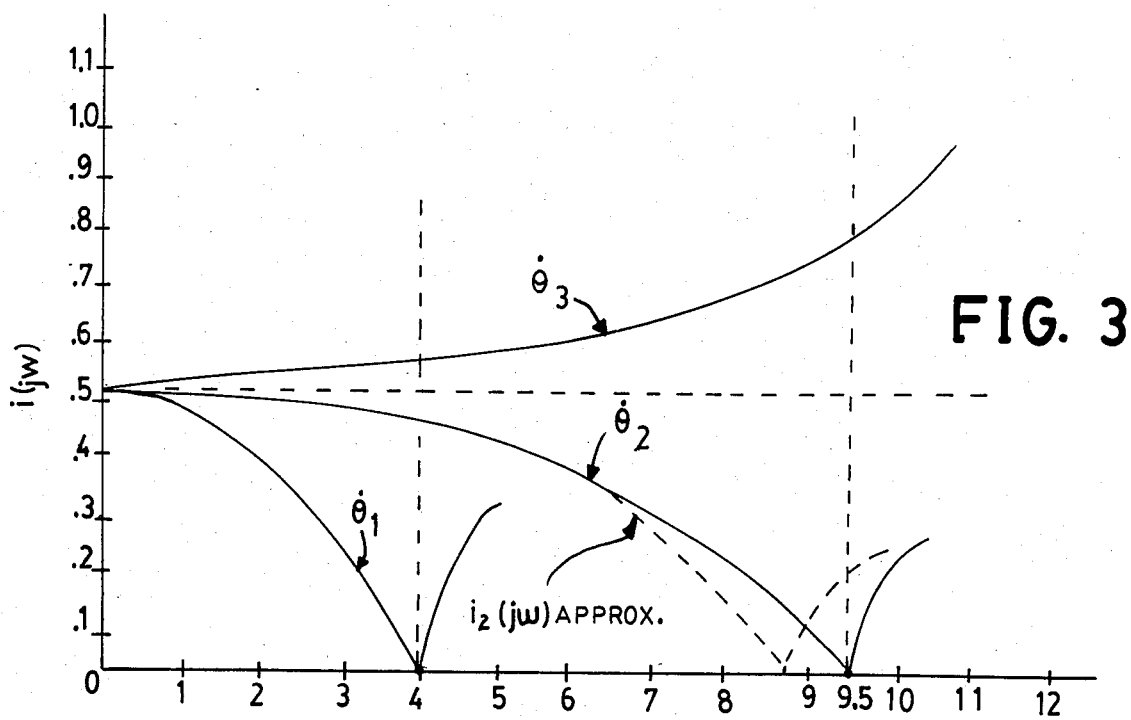
FIG. 3 is a graphical representation of feedback velocities versus input driving frequencies of a structural model of a manipulator for different points of the structure.

For example, and referring now to FIG. 3, a plot of the amplitude of each of the parameters $\dot{\theta}_1$, $\dot{\theta}_2$ and $\dot{\theta}_3$ versus frequency resulting from a sinusoidal input torque to the rotary actuator driving the trunk illustrates that $w_{a1}$ is approximately 4 Hz for an illustrative manipulator configuration.

Accordingly, if the rotary axis of the manipulator is controlled by a conventional joint servo system with the velocity feedback signal $\dot{\theta}_1$, the bandwidth of the velocity loop is limited to approximately 2 Hz and the bandwidth of the position loop is limited to about 1.2 Hz.

In servo controls that utilize a torque command loop with torque related feedback as described in U.S. Pat. No. 4,362,978, the torque or force loop allows a bandwidth of 7-8 Hz. However, at $w_{a1}$, the velocity of the trunk as measured by $\dot{\theta}_1$ drops to nearly zero and a large error signal results. This results in a large displacement of the arm or boom in response to relatively small amplitude velocity commands at the $w_{a1}$ rate; i.e. the trunk effectively stands still and the composite boom-arm portion moves independently of the servo loop control.

This situation results in the servo loop design being limited to relatively low values below the $w_{a1}$ value and is caused by the compliant nature of the load as seen by the trunk at $\dot{\theta}_1$.

One possibility to improve manipulator control is through mechanical design enhancement that provides a stiffer spring member at the joint between the trunk and the arm-boom assembly. However, after the mechanical structure has been optimized, the same limiting situation still is present at a relatively low frequency.

From inspection of the plots of $\dot{\theta}_2$ and $\dot{\theta}_3$ of FIG. 3, it can be seen that the best point on the manipulator structure to sense velocity for the highest possible servo loop bandwidth is at $\dot{\theta}_3$, the velocity of the load at the outer end of the boom-arm assembly. This is true since the bandwidth of a servo loop using $\dot{\theta}_3$ as a feedback signal would be much higher and provide information at the actual point that is desired to be controlled. While this would be ideal in a theoretical sense, it is extremely difficult and impractical to compute or measure $\dot{\theta}_3$. Further, while $\dot{\theta}_2$ would also provide a good feedback signal for servo loop bandwidth purposes, this signal is similarly difficult to either compute or measure. For example, if $\dot{\theta}_2$ is used as a feedback signal, a bandwidth of 4-5 Hz is possible for the velocity loop which is at least twice the limit for the velocity loop using $\dot{\theta}_1$ as the feedback signal.

In accordance with the present invention, the feedback signal $\dot{\theta}_2$ for example is synthesized from the model of the manipulator structure using the $\dot{\theta}_1$ feedback signal and either the applied torque or force to the rotary actuator for a hydraulic actuator or the current to the drive motor for an electrically powered actuator. This enables definition of velocity and position of outer points of the manipulator arm after the compliant member by feedback measurements before the compliant member. In this way, the bandwidth of the velocity servo loop is extended beyond the $w_{a1}$ frequency point but still utilizes the $\dot{\theta}_1$ feedback signal.

For the model of a heavy duty, high payload manipulator including a three mass-two spring system as shown in FIG. 2, in many practial applications, the spring K1 at the top of the trunk (shoulder joint) is much softer and thus a much lower parameter value than the K2 spring representing the compliance of the boom assembly. Accordingly, K2 is much greater than $K_1$ and can be set equal to infinity and thereby disregarded without any appreciable effects on the behavior or analysis of the structural model or the servo control system.

Thus, for ease of illustration, a two mass-one spring model will be utilized to describe the application of the present invention to a heavy-duty manipulator. This is convenient since the model is the same for application to a smaller manipulator. However, it should be understood that the specific model that is utilized for illustration is not to be interpreted in any limiting sense as to the concept or application of the present invention.

Thus, referring again now to FIG. 1, the model and analogue circuit is an approximation for the heavy duty manipulator model of FIG. 2 with $J_2$ of FIG. 1 being equal to and representing the combined inertia $J_t = J_2 + J_3$ of FIG. 2.

From FIG. 1b it can be seen that:

$$\dot{\theta}_2 = \dot{\theta}_1 - \dot{\theta}_{K1} \tag{35}$$

where $\dot{\theta}_{K1}$ is the velocity of the spring member $K_1$.

If $\dot{\theta}_1$ is the sensed position from an encoder and $\dot{\theta}_1$ is the sensed velocity from a tachometer, in order to snythesize a signal for $\dot{\theta}_2$, $\dot{\theta}_{K1}$ must be obtained or resolved. From the analog circuit of FIG. 1b, $\dot{\theta}_{K1}$ is defined aa:

$$\hat{\dot{\theta}}_{K1} = \frac{1}{K_1} \frac{d}{dt}\left[T - J_1\left(\frac{d}{dt}\dot{\theta}_1\right)\right] \tag{36}$$

The $\hat{}$ symbol is utilized to express a synthesized approximate solution. Substituting $\dot{\theta}_{K1}$ of relationship (36) into relationship (35):

$$\hat{\dot{\theta}}_2 = \left[1 + \frac{J_1}{K_1}\left(\frac{d}{dt}\right)^2\right]\dot{\theta}_1 - \frac{1}{K_1}\left(\frac{d}{dt} T\right) \tag{37}$$

If $J_1 < < J_t$ as in the example of the rotary axis for most large manipulators such as the UNIMATE® 2000 and 4000 model manipulators, then $\dot{\theta}_2$ can be rewritten as follows from relationaship (37) to a good approximation to provide a useable estimate for all practical purposes:

$$\hat{\dot{\theta}}_2 = \dot{\theta}_1 - \frac{1}{K_1}\left(\frac{d}{dt}\right)(T) \tag{38}$$

Considering the position $\theta_2$ the position $\theta_2$ can be expressed from FIG. 1 as:

$$\theta_2 = \theta_1 - \theta_{K1} \tag{39}$$

Since $\hat{\theta}_{k1}$ can be expressed from an integration of relationship (36) as:

$$\hat{\theta}_{k1} = \frac{1}{K_1}\left[T - J_1\left(\frac{d}{dt}\dot{\theta}_1\right)\right] \tag{40}$$

Again if $J_1 < < K_1$, then $\hat{\theta}_2$ from relationships (39) and (40) can be expressed as:

$$\hat{\theta}_2 \theta_1 - T/K_1 \tag{41}$$

In accordance with important aspects of the present invention, the feedback signals as represented in relationships (38) and (41) are utilized to provide position and velocity feedback signals representing boom velocity and position beyond the compliant shoulder structure in terms of the position $\theta_1$ and velocity $\dot{\theta}_1$ of the trunk before the compliant structure and the applied torque T; the synthesized feedback signals $\hat{\theta}_2$ and $\hat{\dot{\theta}}_2$ as obtained from load modeling and sensed feedback signals before the compliant structure and nearer the drive point are utilized to provide a servo control loop of improved bandwidth.

Of course, while an example of one degree of compliant motion has been resolved for illustrative purposes to provide synthesized feedback signals, it should be realized that the present invention can also be applied to resolving higher orders or degrees of compliant motion. Of course, such higher degrees of compliant motion become more complex in the provision of a suitable approximation for practical use and the implementation of the servo control system to synthesize the feedback signals as will be described in more detail hereinafter also becomes more complex.

Figure 4:
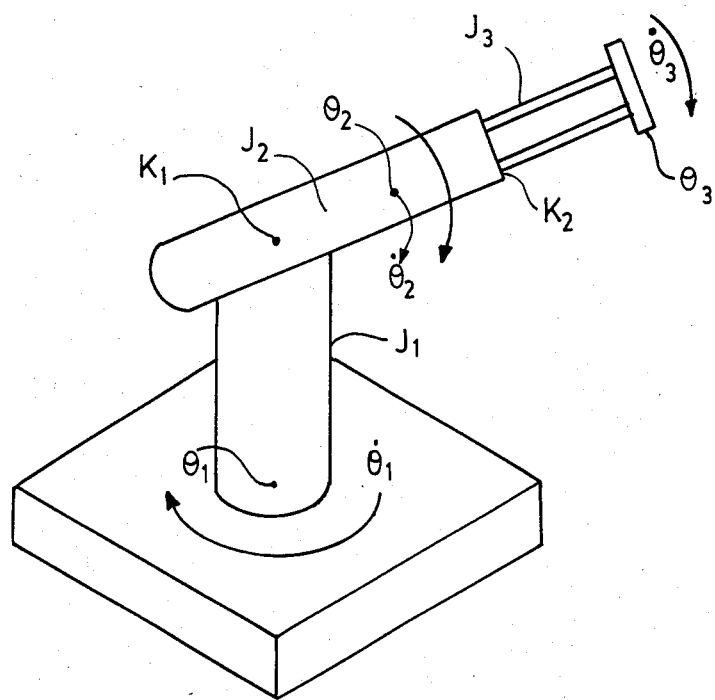
FIGS. 4 and 5 are pictorial representations of two structural models for two respective manipulators.
Figure 5:
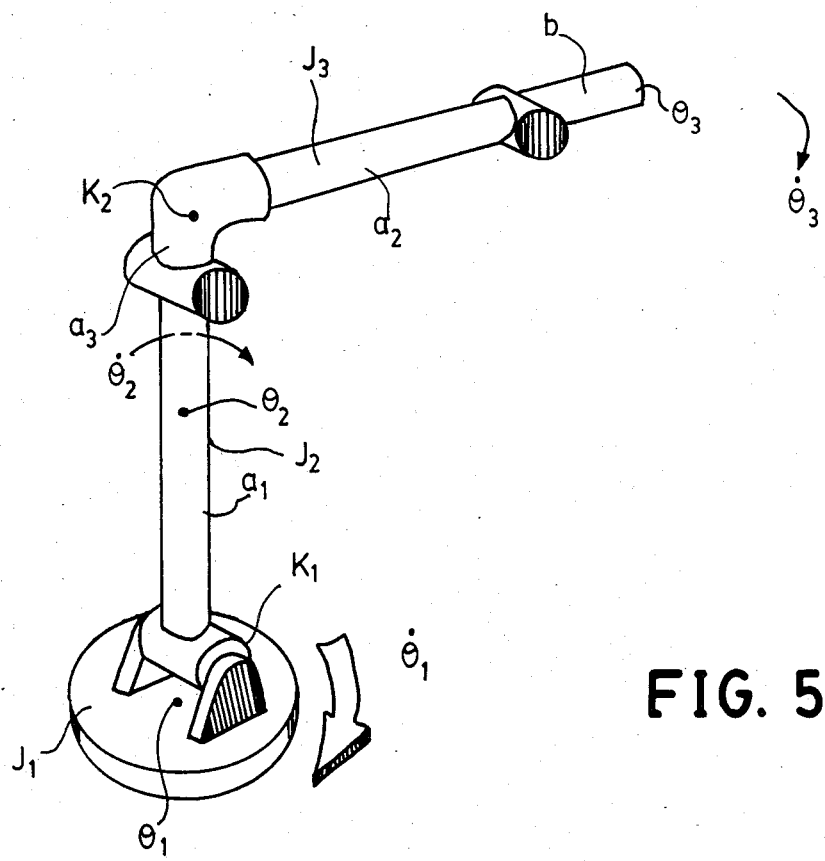

Referring now to FIG. 4, a pictorial representation of the parameters and points of interest are illustrated for the specific example of the rotary axis of a heavy duty manipulator such as a UNIMATE® 2000 or 4000 model manipulator. As discussed hereinbefore, the simplified model of FIG. 1 ignores the contribututiion of $K_2$ and includes the total inertia of $J_2$ and $J_3$ in the $J_2$ term of FIG. 1. Additionally, a representation of the parameters for a revolute manipulator are illustrated in FIG. 5.

Figure 6:
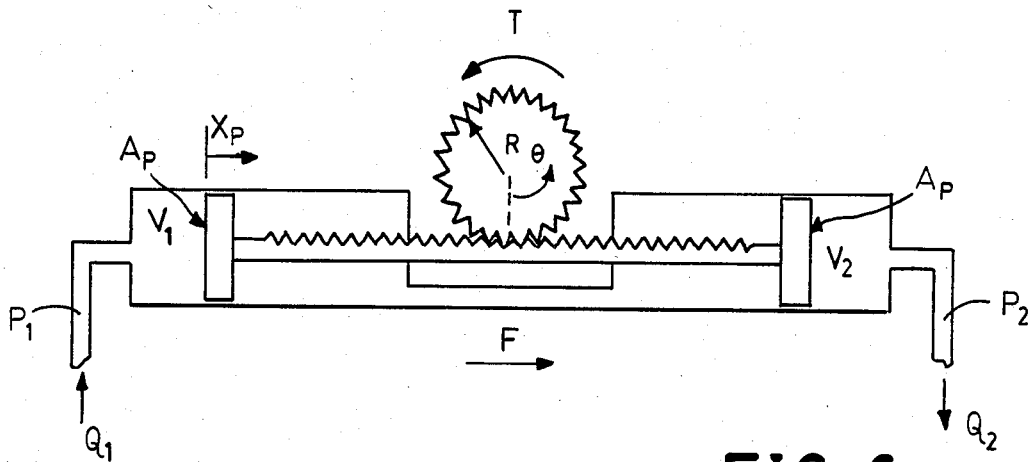
FIG. 6 is a diagrammatic representation of a hydraulic actuator system of a manipulator.

Considering a specific implementation of the present invention to the rotary axis of a UNIMATE 2000 manipulator as an illustrative example and referring now to FIG. 6, the hydraulic actuator and system will be evaluated to provide a block diagram representation. The following parameters depicted in FIG. 6 are defined as follows:

$V_1, V_2$: Volume of forward and return chambers, in$^3$.
$Q_1, Q_2$: forward and return flows, in$^3$/sec.
$P_1, P_2$: forward and return pressures, psi.
$A_p$: area of piston, in$^2$.
$X_p$: displacement of piston, in.
R: radius of the trunk gear, in.
$\theta$: rotation angle of the trunk, radian.
F: linear force, pound.
T: rotational torque, in-lb.

The following relationships are useful in defining the hydraulic actuator system:

$$\Delta P_L = P_1 - P_2$$

$$Q_1 = \frac{dV_1}{dt} + \frac{V_1}{\beta e}\frac{dP_1}{dt}$$

$$Q_2 = \frac{dV_2}{dt} + \frac{V_2}{e} \frac{dP_2}{dt}$$

$$Q_L = \frac{Q + Q_2}{2}$$

$$V_1 = V_o + A_p \times p$$
$$V_2 = V_o - A_p \times p$$
$$V_t = V_1 + V_2\, 2V_o$$

Where $\beta_e$=effective bulk modulus of actuator system, psi
$V_o$=initial volume of each chamber, in$^3$
$V_t$=total contained volume of both chambers, in$^3$
$Q_L$=load flow, in$^3$/sec.

And from the above relationships:

$$Q_L = A\dot{x}p + \frac{V_t}{4\beta e} \frac{dP_L}{dt} + \frac{Axp}{2\beta e}\left(\frac{dP_1}{dt} + \frac{dP_2}{dt}\right)$$

Since $$\text{Since } \frac{dP_1}{dt} + \frac{dP_2}{dt} = \frac{d}{dt}(P_1 + P_2) = d/dt\, P_s = 0$$

where Ps is the constant supply pressure then:

$$Q_L = A\dot{x}p + \frac{V_t}{4e} \frac{dP_L}{dt}$$

Also since:

$$\dot{x}p = R\dot{\theta}, \text{ then } Q_L = AR\dot{\theta} + \frac{V_t}{4} \frac{dP_L}{dt} \quad (42)$$

The relationship between force $F_1$, torque T and load pressure $\Delta P_L$ are:

$$F = AP_L \text{ and } T = ARP_L \quad (43)$$

In the rotary axis of the UNIMATE 2000, A=4.91 in$^2$, R=4.5 in, $V_t$=130 in$^3$, $\beta_e$=2×10$^6$ psi. However, due to trapped air in the flow, $\beta_e$ will be a lower value.

For the specific illustration where a MOOG type A076X775 linear servo valve is controlled to provide the forward and return flows $Q_1$ and $Q_2$, the transfer function between the driving current I (in ma) to the servo valve and the output flow $Q_L$ (in in$^3$/sec.) is:

$$G_1(s) = \frac{Q_L(s)}{I(s)} = \frac{1.625}{1 + \frac{2s}{565} + \left(\frac{s}{565}\right)^2} \quad (44)$$

In general, the relation between $\dot{\theta}$ and applied torque T is:

$$\frac{\dot{\theta}(s)}{T(s)} = \frac{G_L(s)}{J_t s} \quad (45)$$

where $J_t$ is the total inertia of the joint with respect to the center of the trunk gear and $G_2(s)$ represents the load dynamics. If the load has n springs than $G_L(s)$ can be represented by:

$$G_L(s) = \frac{(1 + s^2/w_{a1}^2)(1 + s^2/w_{a2}^2)\ldots(1 + s^2/w_{an}^2)}{(1 + s^2/w_{r1}^2)(1 + s^2/w_{r2}^2)\ldots(1 + s^2/w_{rn}^2)}$$

Figure 7:
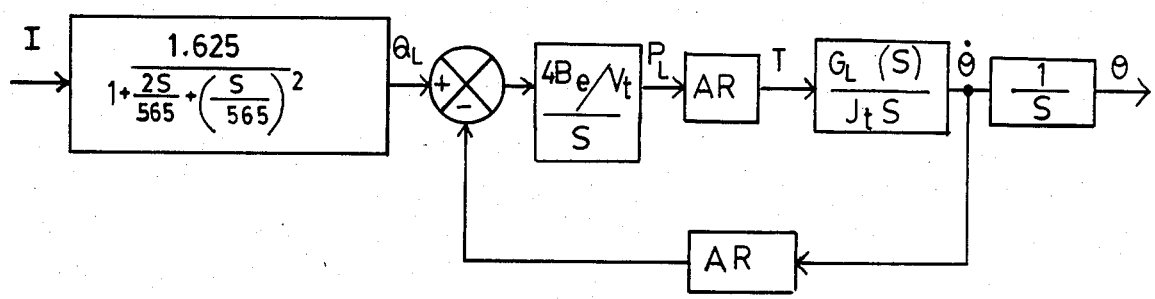
FIGS. 7 and 8 are block diagram representations of transfer function of the hydraulic system of FIG. 6.

From the relationship (42) through (45), the block diagram of the rotary actuator system can be represented as in FIG. 7. Further, the transfer function between truck velocity and flow can be expressed as:

$$\frac{\dot{\theta}(s)}{Q_L(s)} = \frac{\frac{1}{AR}[G_L(s)]}{S^2/w_n^2 + G_L(s)}$$

Where $$w_h = \sqrt{\frac{4\beta e(AR)^2}{V_t J_t}}$$

and $w_h$ is the hydraulic undamped natural frequency.

Also, the relationship between $P_L$ and $Q_L$ can be represented as:

$$G_\theta(s) = \frac{P_2(2)}{Q_L(s)} = \frac{\left(\frac{1}{AR}\right)^2 J_t s}{s^2/w_h^2 + G_L(s)}$$

Figure 8:
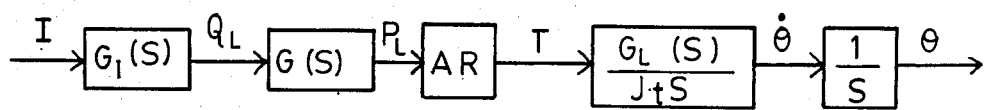

Accordingly, the hydraulic system block diagram of FIG. 7 can be reduced to result in the block diagram of FIG. 8.

Considering the parameters for the rotary axis of the UNIMATE 2000, the following values were obtained by measurement and analysis:

Inertia before shoulder, $J_1$=90 in-lb-sec$^2$
Hand Inertia:
  Boom in: $J_{hi}$=530 in-lb-sec$^2$
  Boom out: $J_{ho}$=2100 in-lb-sec$^2$
Casting Inertia: $J_c = J_{ti} - J_1 - J_{hi}$=360 in-lb-sec$^2$
Load Inertia:
  Boom in: $J_{Li}$=270 in-lb-sec$^2$
  Boom out: $J_{Lo}$=1050 in-lb-sec$^2$ $K_1$=5.1×10$^6$ in-lb/rad.

where $J_{ti}$=total inertia, the load utilized was 65 lb, and $J_c + J_h = J_2$.

While the above values are useful for practice of the present invention and for illustration thereof, it should be realized that the modeled parameters are only an approximation of the actual manipulator. Thus, the analysis is useful to provide values accurate enough to practice the present invention but is to be considered as only an approximate model since manipulators include additional spring members in their structure. The resonant and antiresonant frequencies were also measured providing approximate values of $f_{a1}$=10–12 Hz for load to no-load conditions for antiresonant frequency and 39–40 Hz for resonant frequency. In analysis, other low resonant frequencies in the range of 10–20 Hz were evaluated and either raised in frequency or eliminated by various structural changes including base enhancement, boom extension, rod strengthening, etc.

The rotary axis control system for use with the present invention includes a pressure (torque or force) loop, a velocity loop, and a position loop. A description of this general type of arrangement is described in U.S. Pat. No. 4,362,978 and shown in FIG. 3 of that patent.

Considering first the pressure or force loop, a wide bandwidth MOOG valve MOOGA076X775 driven by a voltage to current servo valve amplifier is suitable for this aplication. The relationship (44) can be rewritten as follows for this arrangement where the gain of the servo amplifier is 1 volt providing 28.37 ma drive current:

$$G_f(s) = \frac{Q_L(s)}{V_s(s)} = \frac{46}{1 + \frac{2}{565}s + \left(\frac{s}{565}\right)^2} \quad (46)$$

where $V_s$ is the driving voltage.

Referring again to FIG. 6, a differential pressure amplifier is utilized to provide the signal $P_L = P_1 - P_2$. Pressure transducers are arranged to measure $P_1$ and $P_2$ and convert psi to voltage for input to the differential pressure amplifier. In a specific implementation, in accordance with the sensitivity and offset of pressure transducers, an offset adjustment and balancing potentiometer is provided to balance the pressure feedback signal. A double integration is also used to provide a more constant response for varying loads at low frequencies. A compensator for the pressure loop is provided to ensure desired frequency response as to gain and phase shift by the transfer functions:

$$G_{P_c}(s) = \frac{K_f(1 + s/5)(1 + 2s/33.3)^2}{s^2(1 + s/100)} \quad (47)$$

Figure 9:
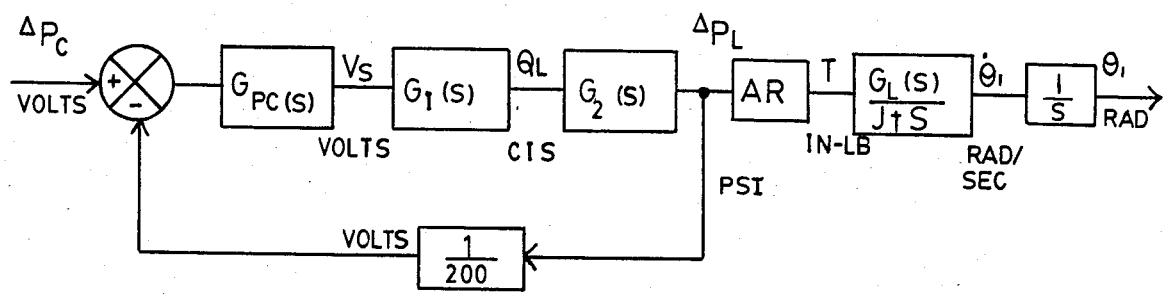
FIG. 9 is a block diagram of a closed loop control system for a pressure or torque loop of a manipulator hydraulic actuator.

A pressure loop bandwidth of 20 Hz is desired for proper response of the overall control system corresponding to a velocity loop with approximately a 6 Hz bandwidth and a position loop with approximately a 3 Hz bandwidth. The resulting closed pressure loop is shown in block diagram form in FIG. 9.

Figure 10:
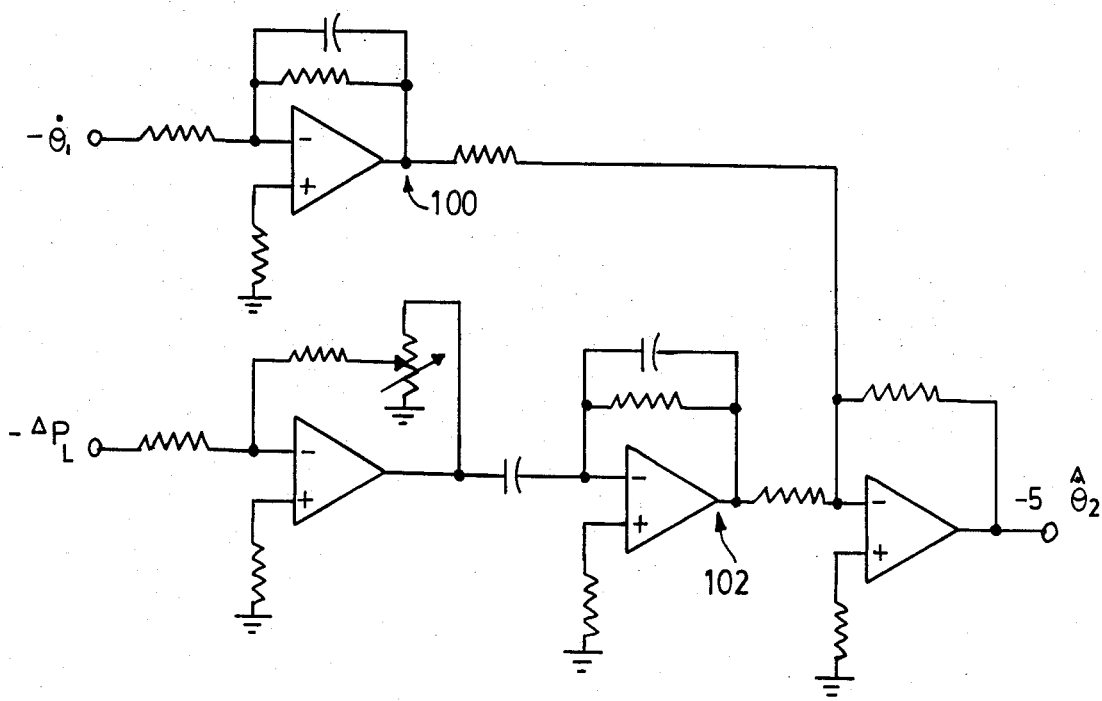
FIG. 10 is a schematic diagram of a feedback synthesis network for a velocity loop in accordance with the principles of the present invention.

Consider now an example where a 3 Hz bandwidth maximum would be typical for a velocity loop driving a composite load with a first antiresonant frequency at 6 Hz. An illustration of the velocity loop in accordance with the resolved compliant motion control of the present invention will be described to provide a minimum 6 Hz bandwidth. Referring now to FIG. 10, the block diagram of the velocity loop illustrates an arrangement to synthesize $\dot{\theta}_2$ in accordance with the relationship described in (38). Additionally loop filters 100 and 102 are added to filter out high frequency noise in the feedback signals from the tachometer at $\dot{\theta}_1$ and the pressure $\Delta P_L$ respectively. Accordingly, the simulated control velocity of the boom or manipulator arm as synthesized from the load model parameter and measured values $\Delta P_L$, $P_L$ and $\dot{\theta}_1$ is given as:

$$\dot{\theta}_2(s) = \left(\frac{1}{1 + s/200}\right)\dot{\theta}_1(s) - \left(\frac{1}{K_s} \cdot \frac{s}{1 + s/200}\right)\Delta P_L(s) \quad (48)$$

where $K_s = K_1/K_m$, $K_m$ is a scale factor to relate $\Delta P_L$ to $\dot{\theta}_1$. In the specific example, $K_s = 1157$.

Figure 11:
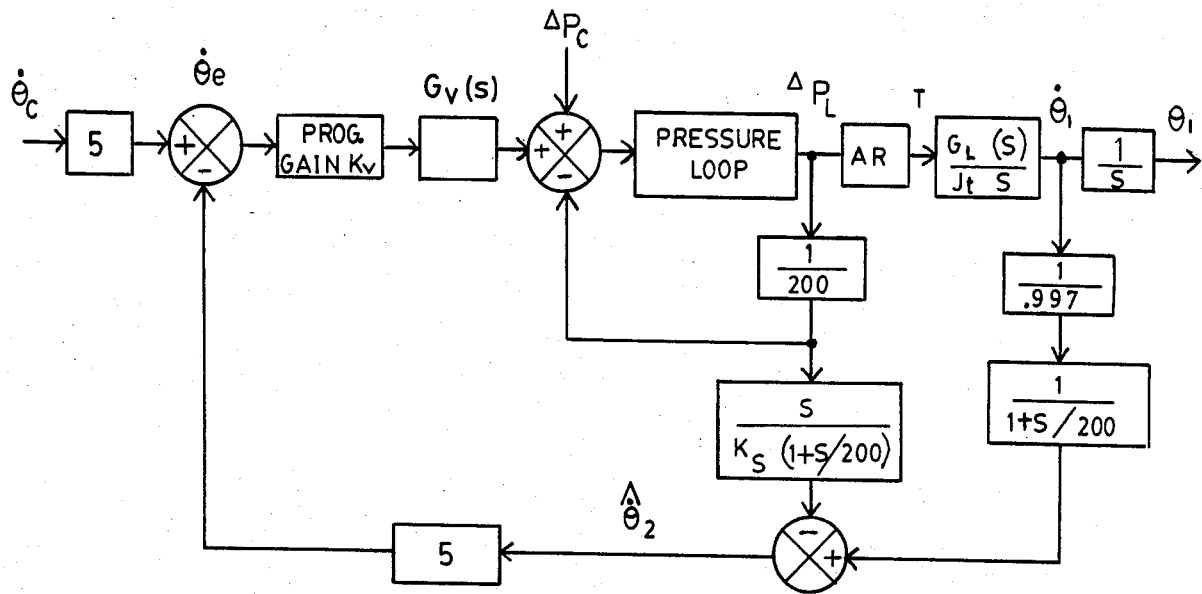
FIG. 11 is a block diagram representation of a closed velocity loop control system for a manipulator in accordance with the present invention.

Referring now to FIG. 11, the overall block diagram of the closed velocity loop is illustrated. The programmable gain block $K_v$ varies in accordance with inertia; reference may be made to U.S. Pat. No. 4,362,978 and U.S. application Ser. No. 478,646 filed by M. J. Dunne on Mar. 25, 1983 now U.S. Pat. No. 4,510,428, for a more detailed discussion of inertial scaling and programmable scaling. Where resonances and/or harmonic noise are encountered, active notch filters are provided in the forward transfer function of the velocity loop. With this arrangement, the composite, synthesized feedback signal provides a response at the first antiresonant frequency of the trunk velocity $\dot{\theta}_1$.

Figure 12:
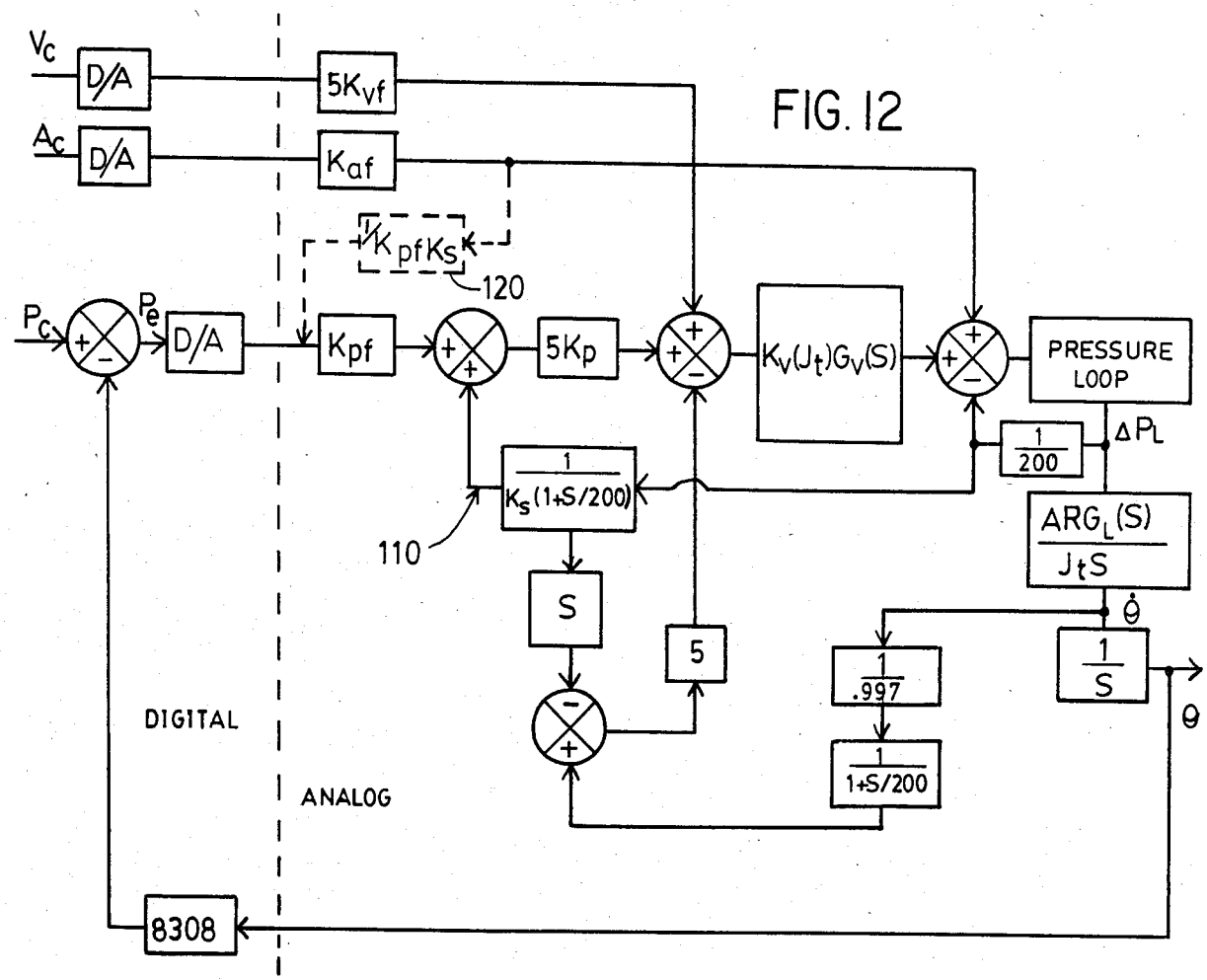
FIG. 12 is a block diagram representation of a control system in accordance with the principles of the present invention.

Considering now the position loop in accordance with the present invention as implemented by relationship (41), the complete rotary axis control system is shown in FIG. 12 including a position compensation gain stage $K_p$.

In certain manipulator apparatus, the position encoder signal includes a low resonant frequency which can be raised for example by providing a stiffer encoder drive chain connection to the drive train. In certain other applications and for certain manipulator arm positions where a filter is required in the forward gain of the velocity loop, the resolved compliant motion control closed position loop may not improve performance of the position loop or may slightly degrade response performance compared to a position feedback signal from $\theta_1$. This is the result of low gain margin due to the velocity filter. For such manipulator structure, the position feedback signal at 110 is omitted from the control system of FIG. 12 so as to remove the closed loop resolved compliant motion control for the position loop. Of course, the $\theta_1$ position feedback is retained. Further, in a specific embodiment where closed loop resolved compliant motion control is not utilized, resolved compliant motion control is provided for the position loop in an open loop fashion by the feed forward block 120 from the pressure-acceleration command.

Further, the structure of the manipulator can be stiffened to raise the lowest antiresonant frequency occurrence and more complex and precise system models can be utilized to further improve the servo response relative to that obtained by the present invention.

However, the use of velocity loop resolved compliant motion control without closed loop position resolved compliant motion control substantiates that resolved compliant motion control improves servo loop response even if only the velocity loop is so modified independent of the position loop. Further, while a control system for the rotary axis is discussed for illustrative purposes, it should be understood that the principles of resolved compliant motion control of the present invention are also applicable to other manipulator axes such as the vertical axis. For a vertical axis implementation, parameters in the model are varied by load, in-out and up-down axis positions.

Figure 13:
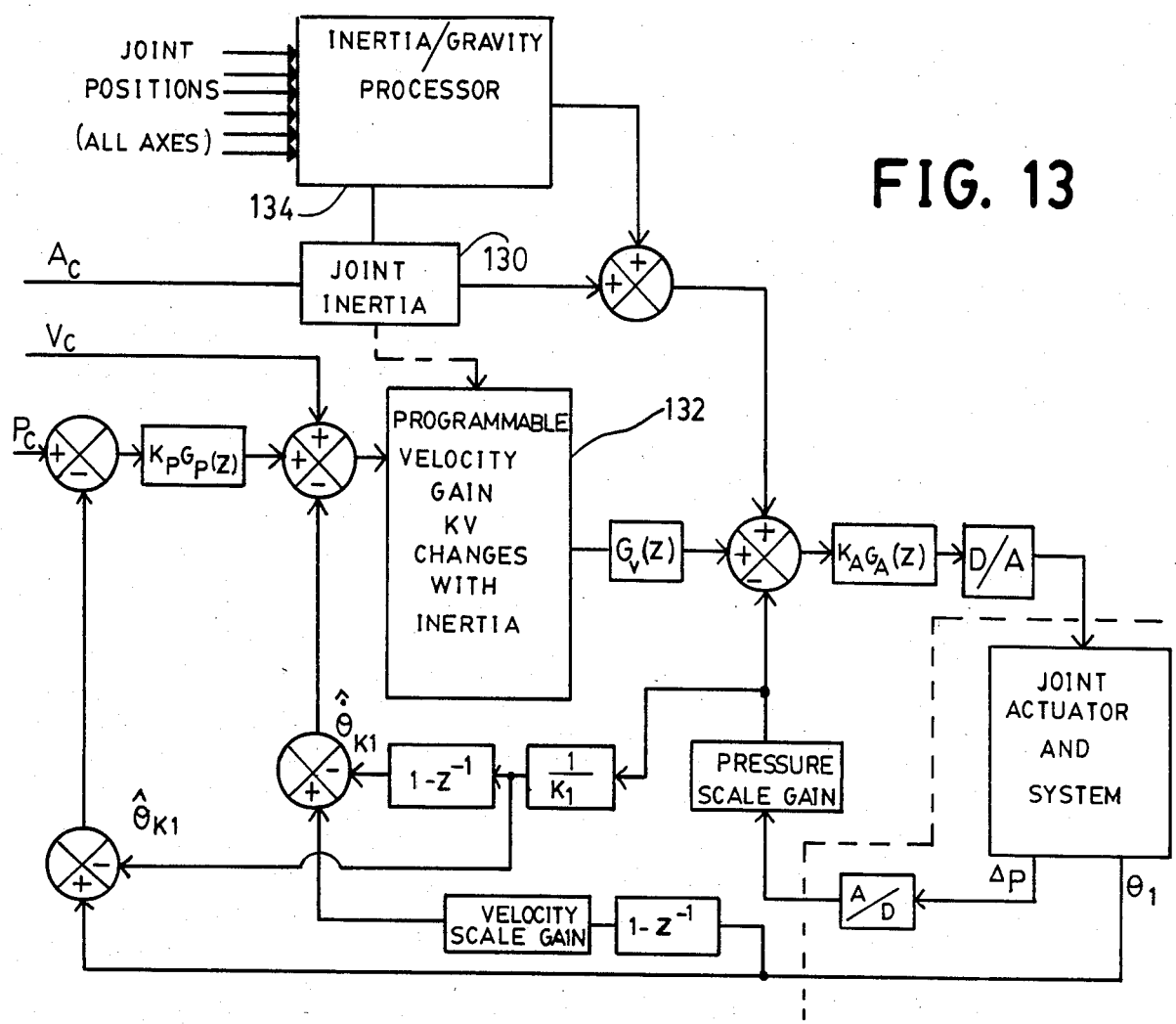
FIG. 13 is a block diagram representation of a digital control system in accordance with the principles of the present invention.

Referring now additionally to FIG. 13, a digital implementation of the servo control system of FIG. 12 using resolved compliant motion control of the present invention is illustrated. Programmable inertia blocks 130 and 132 have been provided in the acceleration-pressure loop and the velocity loop respectively and controlled by an inertia/gravity processor stage 134 in accordance with the principles of inertia scaling as discussed in U.S. Pat. No. 4,362,978 and the aforementioned U.S. application Ser. No. 478,646 now U.S. Pat. No. 4,510,428. The inertia/gravity processor stage 134 includes the joint positions for each axis of the manipulator as inputs.

Figure 14:
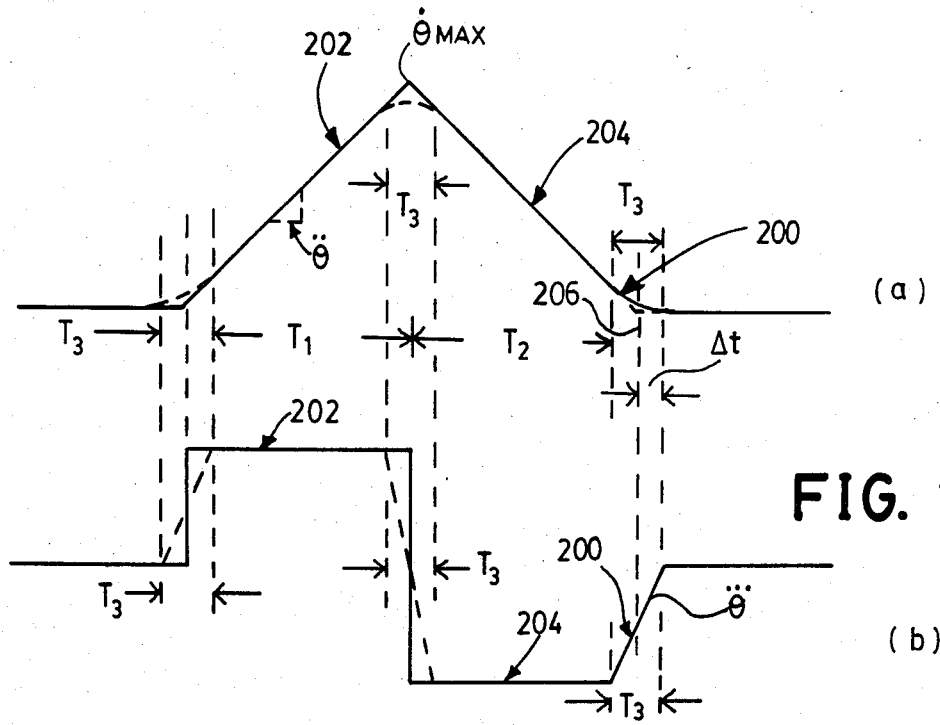
FIGS. 14a and 14b are graphical representation of a velocity profile and a corresponding acceleration profile respectively to illustrate a controlled deceleration characteristic for the control system of the present invention.

In accordance with further important aspects of the present invention the manipulator control system is provided with a controlled deceleration characteristic as shown in FIG. 14 at 200. Reference is made to the VAL ® controller programming manuals and control system of the UNIMATE ® 2000 and PUMA ® model manipulators manufactured by UNIMATION INC with further reference to FIGS. 2 through 6 and 9 through 11 of U.S. Pat. No. 4,338,672 for illustrated position, velocity and acceleration profiles of manipulator movement.

The controlled deceleration characteristic of the present invention for the deceleration of a manipulator arm is especially useful where compliant structure is present. The deceleration characteristic provides a smooth, constantly decreasing deceleration rate between defined movements that is effective to dissipate most of the stored energy in the manipulator due to the compliant members. The dissipation of the stored energy in the compliant members takes place before the manipulator arm arrives at the targeted destination either at the end of a move where the manipulator arm is stopped as in making a spot weld or between moves in changing the direction and/or velocity between the programmed motion of various work cycle steps. The controlled deceleration characteristic is especially useful in combination with resolved compliant motion control to further improve system performance and provide for rapid arm stabilization at the end of a motion to take advantage of the improved servo response time from resolved compliant motion control to reach the destination.

The overall manipulator motion described in FIG. 14 includes a velocity versus time plot or profile in FIG. 14a and an acceleration versus time plot or profile in FIG. 14b. The profile of FIGS. 14a and b include a constant acceleration portion 202 over time interval $T_1$ and a constant deceleration portion 204 over time interval $T_2$. FIG. 14 illustrates a socalled short move where constant acceleration and deceleration of the manipulator arm in each of the axes in a joint coordinated fashion allows the manipulator arm to move between two desired points in space in the minimum time for predetermined dynamic characteristics of the manipulator; e.g. maximum acceleration and deceleration parameters. For a longer move, a constant velocity portion is added to the profiles of FIG. 14 intermediate the acceleration and deceleration portions 202, 204 at a specified velocity such as V maximum.

In accordance with important aspects of the present invention, the controlled deceleration characteristic 200 is added during the time $T_3$ at the termination of the high constant rate deceleration portion 204. In a specific example of the present invention, the characteristic 200 is a linearly decreasing deceleration as seen in FIG. 14b. During this time portion $T_3$, the deflection of the various compliant members of the system are linearly controlled to zero such that the manipulator arm will come to a stop without subsequent perturbations; i.e. the spring members representing the compliance of the structure will be discharged during $T_3$. The compliant members of the structure for example are illustrated by the springs such as $K_1$, $K_2$ etc in the structural models of FIGS. 1 and 2.

Of course, the controlled acceleration/deceleration characteristics such as 200 could also be useful at the beginning of $T_1$ and between $T_1$ and $T_2$. However, the resulting position and velocity error that are introduced during these times are normally not important since the servo control system tracks out such errors before reaching the deceleration portion 200. However, the charactistic 200 at the termination of portion 204 when the manipulator arm is coming to rest is important since this is normally where the work is to be performed and where time is lost if settling is required. Of course, if the end of a move is not critical as to work time settling or no work is to be performed, the characteristic 200 can be eliminated.

It can be seen from FIGS. 14a and b that the move would normally bring the arm to rest at time 206 such that the additional time required for the characteristics 200 is shown by $\Delta t$. However, the characteristic 200 will reduce overall work cycle time whenever the settling time after stopping is greater than $\Delta t$; since the arm when stopped at time 206 requires additional settling time that is greater than $\Delta t$.

Using the structural models and electrical equivalent circuits of FIGS. 1 and 2, the use of the controlled deceleration characteristic with $\ddot{\theta}$=constant over the $T_3$ time of FIG. 14 serves to eliminate arm "ringing" and reduce settling time as the target position is achieved. Ringing and settling can be reduced and avoided if all the kinetic and potential energy are controlled to zero at the target destination point. In structural terms, this means that the velocities in $J_1$, $J_2$ and $J_3$ should be as close to zero as possible. Similarly, there should be as little twist as possible in spring elements $K_1$ and $K_2$.

Considering first the simplified model of FIG. 1, $J_2 >> J_1$ and therefore $E_1$ is approximately equal to $E_2$. Controlling $E_1$ so that it linearly ramps to zero over $T_3$ results in a constant rate of discharge of spring $K_1$ equal to $(1/K_1)dE_1/dt$. This discharge current is "steered" into $J_1$ by the resolved compliant motion control velocity control loop that commands and controls $\dot{\theta}_2$. At the end of the time interval $T_3$, there is no charge left in $1/K_1$ and the spring $K_1$ is totally unwound. Simultaneously, there is no residual velocity in $J_2$, and therefore the kinetic energy in $J_2$ is equal to zero. The result is a kinetic minuscule kinetic energy in $J_1$ which is of little or no consequence. The arm comes to rest with $\theta_2 = \theta_{2command}$, $\dot{\theta}_2 = \dot{\theta}_{2command} = 0$. The advantage derived here is that the residual velocity resides in $J_1$; e.g. for the example of a UNIMATE 2000 robot with the boom-out and full load in rotary, $J_1$ has an inertia value of approximately 1/40th of $J_2$. Consequently, we have reduced the ringing error energy potential by 39/40ths of that which would have existed without resolved compliant motion control. By controlling $\dot{\theta}_2$, rather than $\dot{\theta}_1$, the kinetic energy in $J_2$ is controlled to zero at the end of $T_3$ with a small fraction of the residual kinetic energy which would exist had this discharge current been left in $J_2$ in lieu of $J_1$. This clearly demonstrates how resolved compliant motion control provides superior response via minimizing kinetic energy at the time the target destination is reached.

Considering now the three mass-two spring model of FIG. 2b, including springs $K_1$ and $K_2$, we recognize that the simplified resolved compliant motion control circuit will reduce the residual energy to the extent as was achieved in connection with the model of FIG. 1. The reduced effectiveness is small however since most of the potential energy in the system at the start of the $T_3$ interval resides in $K_1$, and this energy is handled in the same fashion as before; (the potential energy in $K_1$ is typically seven times greater than that in $K_2$ for a series 2000 manipulator arm). The potential energy in $K_2$ is primarily dissipated by the control system, as a result of the controlled deceleration characteristic $T_3$ interval. However, since we are controlling $\dot{\theta}_2$ and not $\dot{\theta}_3$, we are left with a residual value for $\dot{\theta}_3 = -1/K_2(d/dt)(E_{2K}(t))$, which corresponds to minus the constant spring unwind velocity ($-\dot{\theta}_{2K}$) over the $T_3$ interval. The potential energy in $K_2$ is calculated to be 8.44 in-lbs. for a given move example, and at the end of the $T_3$ section, the potential energy in $K_2$ is reduced to essentially zero; however, a small residual kinetic energy remains in $J_3$ equal to 0.2364 in-lbs. In this fashion, 97% of the stored energy in $K_2$ has been removed leaving 3% as kinetic energy in $J_3$. This small residual kinetic energy translates into a damped peak rotary deflection "ring" at the end of a 120" arm boom of approximately ±0.013"; this order of disturbance is quite acceptable for most applications.

In conclusion, the combination effect of the controlled deceleration characteristic during the interval $T_3$ and resolved compliant motion control serve to eliminate most of the ringing at the target destination. The controlled deceleration interval results in a smooth unwind of the $K_1$ and $K_2$ springs, leaving a residual velocity equal to $(-1/k_1)(d/dt)(E_{1K}(t))$ in $J_1$ and a residual velocity equal to $(-1/k_2)(d/dt)(E_{2K}(t))$ in $J_3$. The greater the $T_3$ time interval the less the residual velocity and the lower the final kinetic energy in the manipulator arm system. The resolved compliant motion control technique serves to control $\dot{\theta}_2$, which results in "steering" the larger constant $\dot{\theta}_{K1}$ discharge velocity into $J_1$ in lieu of the much larger $(J_2+J_3)$ inertia path, thereby reducing the residual kinetic energy to a factor of $J_1/(J_2+J_3)$ approximately equal to 1/40th of the residual kinetic energy that would exist without resolved compliant motion control.

While there has been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A control system for manipulator apparatus having a manipulator arm and a predetermined geometrical configuration and structure controllable in a plurality of axes, each controllable axis including drive arrangements for moving the manipulator structure in each of the respective axes, said manipulator structure including compliance intermediate outer portions of the manipulator arm and inner portions of the manipulator arm proximate the drive arrangements, said control system comprising:
    means for a feedback signal representing the velocity of the manipulator arm in at least one controllable axis, said feedback signal being sensed at and representing velocity at a point between said compliance and said drive arrangement;
    means for generating a drive signal representing the torque of the drive arrangement applied to the manipulator structure in said one controllable axis; and
    means responsive to said feedback signal and said drive signal for generating a synthesized feedback signal representing the velocity of the manipulator arm in said one axis at a point after said compliance.

2. The control system of claim 1 further comprising means for providing command signals representing desired work movements of the manipulator arm and means responsive to said command signals and said synthesized feedback signals for moving said manipulator arm in accordance with said desired work movements and position represented by said command signals.

3. The control system of claim 2 wherein said command signals represent manipulator arm position and velocity in at least said one axis.

4. The control system of claim 2 wherein said command signal providing means further comprises means for providing predetermined controlled deceleration characteristic for the manipulator arm at the end of each arm movement.

5. The control system of claim 4 wherein said predetermined controlled deceleration characteristic is a constantly decreasing deceleration rate.

6. The control system of claim 2 further comprising means for storing and reading out program control signals, said command signal providing means being responsive to said program control signals.

7. A method for controlling a manipulator having a manipulator arm controllable in a plurality of axes and a driven support structure for the manipulator arm, the method comprising the steps of:
    generating command signals representing at least the desired velocity of the manipulator arm in at least a first axis at a predetermined point on the manipulator structure, said manipulator structure including compliance intermediate said predetermined point and the driven point of the support structure;
    synthesizing feedback signals corresponding to position and velocity of the manipulator arm in at least said first axis at said predetermined point on the manipulator structure in response to measured position and velocity signals from the manipulator structure derived from measurement at a point closer to the driven point of the support structure than said predetermined point and before said compliance; and
    controlling movement of the manipulator arm in a servo loop in accordance with the synthesized feedback signals and the command signals.

8. A method for controlling a manipulator having a manipulator arm and drive means for moving said arm in a plurality of axes, said arm having support structure which includes compliance in at least one of said axes intermediate the outer end of said arm and the drive means for said one axis, which comprises the steps of:
    generating a command signal representing at least the desired velocity of said arm in said one axis during movement to a predetermined location;
    generating a velocity feedback signal corresponding to the actual velocity of said manipulator arm in said one axis at a point between said compliance and said drive means for said one axis;
    developing a quantity corresponding to the component of velocity lost in said compliance during movement of said arm in said one axis;
    utilizing said actual velocity feedback signal and said lost velocity quantity to provide a synthetic velocity feedback signal representing the actual velocity of said arm in said one axis at a point between said compliance and the outer end of said arm; and
    controlling movement of said manipulator arm in said one axis in accordance with said command signal and said synthetic velocity feedback signal.

9. The method of claim 8, wherein said synthetic velocity feedback signal is equal to $\dot{\theta}_1 - 1/K_1 (d/dt)(T)$, where $\dot{\theta}_1$ is said actual velocity feedback signal, $K_1$ is the spring rate of said compliance, and T is the torque developed by said drive means for said one axis.

10. The method of claim 8, wherein said command signal includes a component representing a desired position to which said arm is to be moved, said method including the steps of:
  generating a position feedback signal corresponding to the actual position of said arm in said one axis at a point between said compliance and said drive means for said one axis;
  developing a quantity corresponding to the component of position lost in said compliance during movement of said arm in said one axis;
  utilizing said actual position feedback signal and said said lost position quantity to provide a synthetic position feedback signal representing the actual position of said arm in said one axis at a point between said compliance and the outer end of said arm; and
  controlling movement of said manipulator arm in said one axis in accordance with said position component of said command signal and said synthetic position feedback signal.

11. The method of claim 10, wherein said synthetic position feedback signal is equal to $\theta_1 - T/K_1$, where $\theta_1$ is said actual position feedback signal, $K_1$ is the spring rate of said compliance, and T is the torque developed by said drive means for said one axis.

12. The method of claim 8, wherein said command signal includes a controlled deceleration characteristic portion as the arm approaches said predetermined location so that most of the energy stored in said compliance is dissipated before the arm reaches said predetermined location.

13. The method of claim 12, wherein said controlled deceleration characteristic causes said arm to decrease at a constant rate of deceleration.

14. The method of claim 8, wherein said command signal comprises a velocity profile representing a desired variation in the velocity of said arm in said one axis during movement to said predetermined location.

15. The method of claim 14, wherein said velocity profile includes a controlled deceleration portion as the arm approaches said predetermined location so that most of the energy stored in said compliance is dissipated before the arm reaches said predetermined location.

16. The method of claim 15, wherein said controlled deceleration portion produces a linear decrease in the rate of deceleration of said arm as said arm approaches said predetermined location.

17. A control system for a programmable manipulator having a manipulator arm and drive means for moving said arm in a plurality of axes, said arm having support structure which includes compliance in at least one of said axes intermediate the outer end of said arm and the drive means for said one axis, comprising:
  means for generating a velocity feedback signal corresponding to the actual velocity of said manipulator arm in said one axis at a point between said compliance and said drive means for said one axis,
  means for devloping a quantity representing the portion of said actual velocity which is lost in said compliance during movement of said arm in said one axis; and
  means responsive to said velocity feedback signal and said quantity representing said lost velocity for developing a synthetic velocity feedback signal representing the velocity of said manipulator arm in said one axis at a point between said compliance and the outer end of said arm.

18. The control system of claim 17, which includes means for providing a command signal representing a desired velocity of movement of said arm, and servo loop means responsive to said command signal and said synthetic velocity feedback signal for controlling said drive means.

19. The control system of claim 18, wherein said command signal comprises a velocity profile representing a desired variation in the velocity of said arm in said one axis during movement to a predetermined location.

20. The control system of claim 19, wherein said velocity profile includes a controlled deceleration portion as the arm approaches said predetermined location so that most of the energy stored in said compliance is dissipated at the time said arm reaches said predetermined location.

21. The control system of claim 20, wherein said controlled deceleration portion of said velocity profile produces a linear decrease in the rate of deceleration of said arm as said arm approaches said predetermined location.

22. A control system for a programmable manipulator having a manipulator arm and drive means for moving said arm in a plurality of axes, said arm having support structure which includes compliance in at least one of said axes intermediate the outer end of said arm and the drive means for said one axis, said support structure having a relatively low first anti-resonant frequency due to said compliance, comprising:
  means for generating a velocity feedback signal corresponding to the actual velocity of said manipulator arm in said one axis at a point between said compliance and said drive means for said one axis,
  means responsive to said actual velocity feedback signal for developing a quantity representing the actual velocity of said arm in said one axis at a point between said compliance and the outer end of said arm, and
  servo-loop means for controlling said drive means for said one axis in accordance with an input command signal and employing said quantity as a synthetic velocity feedback signal, whereby the bandwidth of said servo loop means may be increased above said first anti-resonant frequency of said support structure.

23. The control system of claim 22, which includes means for generating a drive signal corresponding to the torque developed by said drive means for said one axis, and means jointly responsive to said actual velocity feedback signal and said drive signal for devloping said quantity.

24. The control system of claim 23 wherein said quantity is proportional to $\dot{\theta}_1 - 1/K_1 (d/dt)(T)$, where $\dot{\theta}_1$ is said actual velocity feedback signal, $K_1$ is the spring rate of said compliance, and T is the torque developed by said drive means for said one axis.

25. The control system of claim 22, wherein said command signal includes a component representing a desired position to which said arm is to be moved, means for generating a position feedback signal corresponding to the actual position of said arm in said one axis at a point between said compliance and said drive means for said one axis, means responsive to said actual position signal for developing a further quantity representing the actual position of said arm in said axis at a point between said compliance and the outer end of said arm, and means utilizing said further quantity in said servo loop means as a synthetic position feedback signal.

26. The control system of claim 25, wherein said further quantity is equal to $\theta_1 - T/K_1$, where $\theta_1$ is said actual position feedback signal, $K_1$ is the spring rate of said compliance, and T is the torque developed by said drive means for said one axis.

* * * * *

UNITED STATES PATENT AND TRADEMARK OFFICE
CERTIFICATE OF CORRECTION

PATENT NO. : 4,603,284
DATED : July 29, 1986
INVENTOR(S) : William Perzley

It is certified that error appears in the above—identified patent and that said Letters Patent are hereby corrected as shown below:

Column 15, line 50, --generating-- should be inserted between "for" and "a";

Column 16, line 1, "and position" should be canceled;

Column 16, line 9, --predetermined-- should be inserted after the word "each";

Column 17, line 61, "devloping" should be --developing--; and

Column 18, line 52, "devloping" should be --developing--.

Signed and Sealed this

Ninth Day of December, 1986

*Attest:*

DONALD J. QUIGG

*Attesting Officer*         *Commissioner of Patents and Trademarks*